United States Patent Office

3,445,522
Patented May 20, 1969

3,445,522
ORGANOPHOSPHORUS COMPOUNDS
Hugh R. Hays, Colerain Township, Hamilton County, Ohio, and Gennady M. Kosolapoff, Auburn, Ala., assignors to The Procter & Gamble Company, Cincinnati, Ohio, a corporation of Ohio
No Drawing. Filed Oct. 11, 1965, Ser. No. 494,904
Int. Cl. C07f 9/50
U.S. Cl. 260—606.5     6 Claims

ABSTRACT OF THE DISCLOSURE gem-Diphosphines, having the general formula, $$RR'C(PH_2)_2$$

and methods for their preparation are disclosed. The gem-diphosphines have utility as intermediates in the preparation of detergents, detergency builders and fabric softeners.

---

This invention relates to the preparation of a new and useful class of organophosphorus compounds. More specifically, it relates to a class of organic diphosphines wherein both phosphine substituents are located on a single carbon atom. These compounds, properly called gem-diphosphines, have the general formula $RR'C(PH_2)_2$. The nature of the R and R' groups are more fully explained hereinafter.

The field of organophosphorus chemistry is one of ever increasing interest and importance to the practitioners in the chemical industry. This is particularly true in the synthetic detergent field where a number of organophosphorus compounds, such as the phosphate and phosphanate esters of British Patent 995,355, have demonstrated pronounced detergent properties and other organophosphorus compounds such as the ethane-1-hydroxy-1,1-diphosphonates of U.S. Patent 3,159,581, have exhibited exceptionally good detergency builder properties. Further, certain organophosphorus compounds are useful fabric softeners. For example, see U.S. Patent 2,256,112.

As a result, there is a large interest in the production of organophosphorus materials which can be used as starting materials or as intermediates in the preparation of the organophosphorus compounds described hereinbefore and other desirable organophosphorus products. Further, there has been a distinct need for organophosphorus compounds containing more than one highly reactive site for use in preparing a wide variety of new and useful organophosphorus compounds.

In the past the unavailability of a variety of multifunctional, unsubstituted organophosphorus compounds has been a severe limitation upon the producer of useful organophosphorus products, and a particularly severe limitation upon the scientist working in this area.

It is therefore an object of this invention to present a new and useful class of organophosphorus compounds and a method for their preparation.

It is a further object of this invention to present a new class of organic diphosphine compounds wherein both phosphine substituents are located on a single carbon atom.

It is another object of this invention to present a new class of organic diphosphine compounds which are useful in the preparation of detergents, detergency builders and fabric softeners.

Other objects and advantageous features of this invention will become apparent from the following description and claims.

It has now been found that the above objects can be achieved by the preparation of a series of compounds having the general formula $RR'C(PH_2)_2$ wherein R and R' are each selected from the group consisting of hydrogen and hydrocarbon groups having from one to about twenty-two carbon atoms each, the total of said carbon atoms in the diphosphine being less than about thirty six.

The above-described class of compounds, which constitutes the subject matter of this invention (hereinafter called the "gem-diphosphines"), are unique in that they can be used to prepare with comparative ease highly substituted organophosphorus compounds which could be prepared only with great difficulty from compounds of the prior art. More important, this class of gem-diphosphines makes possible the preparation of compounds, as hereinafter set forth, which were impossible to prepare previously, thus opening for research previously unattainable areas of organophosphorus chemistry.

The reason for the uniqueness of the novel compounds disclosed herein stems from the fact that two phosphine radicals ($-PH_2$) are present on the same carbon atom. Thus, there are two highly reactive trivalent phosphorus atoms attached to the same carbon atom making this site a prime location for preparing a plurality of phosphorus substituted functional groups.

As indicated above, R and R' can be hydrogen. In this case the novel compound is diphosphinomethane, $$CH_2(PH_2)_2$$

This is one of the preferred embodiments of this invention because diphosphinomethane (as shown in Example II, below) can be readily converted to methylenediphosphonic acid, $CH_2[P(O)(OH)_2]_2$, a very desirable detergency builder. See United States Patent 3,213,030 of Francis L. Diehl, issued Oct. 19, 1965.

Further, one or both of R and R' can be a hydrocarbon group having from one to about twenty-two carbon atoms, provided that when both R and R' are hydrocarbon groups, the total of the carbon atoms does not exceed about thirty-six. As used herein, the term "hydrocarbon groups" refers to both unsubstituted hydrocarbon groups and substituted hydrocarbon groups containing, for example, from one to about five ether or sulfide linkages, such as 2-decyloxyethyl and 2-octadecyloxyethyl groups. Preferably the substituent hydrocarbon groups in the formulas above and below are alkyl chains, straight or branched, containing from 1 to about 22 carbon atoms (e.g., methyl, ethyl, n-propyl, iso-propyl, n-butyl, iso-butyl, n-pentyl, iso-pentyl, n-hexyl, n-heptyl, n-octyl, iso-octyl, 2-ethylhexyl, di-iso-butyl, n-nonyl, tripropylene, n-decyl, undecyl, n-dodecyl, tridecyl, n-tetradecyl, pentadecyl, n-hexadecyl, n-heptadecyl, n-octadecyl, eicosyl, docosyl, triacontyl, cyclopentyl, cyclohexyl, cyclohexylmethyl, methylcyclohexyl, 2-cyclohexylhexyl, dodecyl, 12-cyclohexyldodecyl and 4-dodecylcyclohexyl). Examples of other acceptable hydrocarbon groups include straight chain or branched alkenyl and polyalkenyl groups having from 2 to about 22 carbon atoms (e.g., 2-propenyl, 2-iso-butenyl, 3,5-hexadienyl, 3-ethyl-1-octenyl, 6-decenyl, 5 - dodecenyl, 10 - tetradecenyl, 9 - hexadecenyl, 14-octadecenyl and 3,8-docosadienyl); straight chain or branched alkynyl and polyalkynyl groups having from 2 to about 22 carbon atoms (e.g. ethynyl, 2-propynyl, 1,3-butadiynyl, 3-iso - pentynyl, 4 - propynyl - 1 - pentynyl, 5-decnyl, 9-dodecynyl, 7 - tetradecynyl, 13 - hexadecynyl, 2-ocetadecynyl and 6,16-docosadiynyl); aryl groups containing 6 to 12 carbon atoms (e.g., phenyl, biphenyl and naphthyl); and alkyl aryl groups containing benzene or naphthalene groups with branched or straight alkyl chains of from 1 to about 18 carbon atoms (e.g., benzyl, 2-phenyldodecyl, 1-methyl-2-phenylethyl, 2-indenyl and naphthylmethyl).

A particularly preferred embodiment of this new class of compounds is found when R' is hydrogen and R is a straight chain alkyl group having from about 8 to about 18 carbon atoms. This alkyl chain length is in the range best suited for the hydrophobic end of a surface active molecule. Further, the two phosphine groups are located at one extreme of the alkyl chin, making this site available for the substitution of a plurality of hydrophilic radicals. Thus, these preferred compounds are starting materials for the preparation of unique and highly efficient surface active materials. Typical examples of this preferred group of gem-diphosphines are 1,1-diphosphinodecane, 1,1-diphosphinoundecane, 1,1-diphosphinododecane, 1,1-diphosphinotridecane, 1,1 - diphosphinotetradecane, 1,1 - diphosphinopentadecane, 1,1 - diphosphinohexadecane, 1,1 - diphosphinoheptadecane and 1,1-diphosphinooctadecane.

The compounds of this invention can be prepared from the corresponding diphosphonate compounds $$RR'C[P(O)(OR'')_2]_2$$

where R and R' are hydrocarbon groups as defined above, and each R'' is a hydrocarbon group having the same definition as R and R', preferably a straight or branched alkyl chain having from one to about eight carbon atoms. The diphosphonate compounds wherein R'' is a hydrocarbon group can be hydrolyzed to form the corresponding diphosphonic acids, $RR'C[P(O)(OH)_2]_2$ by treatment with strong acids, such as hydrochloric acid. The diphosphonic acids can be reacted with phosphorus pentahalides, such as $PCl_5$, to form the corresponding diphosphonyl tetrahalides, such as $RR'C[P(O)Cl_2]_2$, which in turn are reducible by treatment with strong reducing agents such as lithium aluminum hydride, $LiAlH_4$, to form the compounds of the invention.

The above reaction of diphosphonic acids with phosphorus pentahalides must be conducted at a temperature between about 15° C. and about 75° C. Below about 15° C., the reaction proceeds too slowly, and above about 75° C., undesirable side reactions become dominant. For similar reasons, the reduction of diphosphonyl tetrahalides with lithium aluminum hydride should be conducted between about —15° C. and 15° C.

In the case where neither R nor R' is hydrogen, the process can be simplified. In this situation, certain undesirable side reactions with the phosphorus pentahalides need not be considered and the diphosphonates can be reacted directly with the phosphorus pentahalides. This eliminates the ned to hydrolyze the diphosphonates to the diphosphonic acids prior to reaction with the phosphorus pentahalides. While the hydrolyzation step can still be conducted if desired, no appreciable benefit will be gained thereby.

The gem-diphosphines can also be prepared, as more particularly described in Example III, by direct reduction of the corresponding gem-diphosphonates, described above. However, the yields of the gem-diphosphines from reduction of the gem-diphosphonates are considerably lower than those obtained in the reduction of the gem-diphosphonyl tetrahalides.

A suitable starting material is a tetraalkyl methylenediphosphonate, such as tetraisopropyl methylenediphosphonate, $H_2C[P(O)(OC_3H_7)_2]_2$. The tetraalkyl methylenediphosphonates can be prepared as described in, e.g., the article by Ford-Moore in J. Chem. Soc. (1947), pages 1465–67, and in the co-pending U.S. patent application of Clarence H. Roy, Ser. No. 218,862, filed Aug. 23, 1962. These compounds can be used directly in the manner described above and as more particularly described in Example I, below, to produce diphosphinomethane, a preferred member of the new class of organophosphorus compounds disclosed herein.

To prepare organic diphosphines of the form $$RR'C(PH_2)_2$$

wherein R' is hydrogen and R is a hydrocarbon group as defined above, the tetraalkyl methylenediphosphonates can be reacted with sodium hydride, NaH, to form sodium methylenediphosphonates, $NaCH[P(O)(OR'')_2]_2$. The sodium methylenediphosphonates, in turn, can be reacted with an organic halide, RX, where X is a halogen such as chlorine or bromine, and R is the desired hydrocarbon group or mixture of groups. The products are alkylidenediphosphonates, $RCH[P(O)(OR'')_2]_2$, which can be hydrolyzed, reacted with a phosphorus pentahalide and reduced with a strong reducing agent as described above, and as more particularly described in Example II below, to produce terminal gem-diphosphinoalkanes of the form $RCH(PH_2)_2$, members of the new and useful class of organophosphorus compounds disclosed herein.

In order to produce gem-diphosphino alkanes of the form $RR'C(PH_2)_2$, wherein both R and R' are hydrocarbon groups as defined above, the alkylidenediphosphonates, $RCH[P(O)(OR'')_2]_2$, described above, are reacted with sodium hydride a second time to form the sodium alkylidenediphosphonates, $RNaC[P(O)(OR'')_2]_2$. This compound is then reacted with R'X where X is a halogen such as chlorine or bromine and R' is the second desired hydrocarbon group or mixture of hydrocarbon groups, to form $RR'C[P(O)(OR'')_2]_2$. Further processing is as described above and as more particularly described in Example VI below, to form the gem-diphosphines of the form $RR'C(PH_2)_2$, members of the class of organophosphorus compounds disclosed herein.

The starting materials and products of the reactions disclosed herein tend to oxidize rather rapidly. As a result, the materials must be stored and reactions performed under an inert atmosphere. Examples of gases which are successfully used in maintaining such an atmosphere are argon, krypton and nitrogen.

The following examples are intended to demonstrate the preparation of organophosphorus compounds of the form $RR'C(PH_2)_2$, the new and novel compounds of this invention, and their use in the preparation of other useful organophosphorus materials. However, the examples are not intended to be limitations upon the invention. All reactions in the following examples were conducted under an argon atmosphere in a well-ventilated hood.

EXAMPLE I

Diphosphinomethane (A) (Diphosphinomethane is extremely pyrophoric and must be isolated from air at all times.) Phosphorus pentachloride (250 g., 1.21 moles) was placed in a three-necked flask equipped with (1) an addition funnel containing 68.8 g. (0.2 mole) of tetra-iso-propyl methylenediphosphonate, (2) a paddle stirrer, (3) a condenser, (4) an argon source and (5) three traps. The last trap contained a 25% NaOH solution for scrubbing the HCl from the exit gases. After purging all air from the flask and adjusting a minimum flow of argon through the traps, the tetra-iso-propyl methylenediphosphonate was dripped slowly onto the phosphorus pentachloride. Once addition was completed, the reaction mixture was heated to about 85° C. for about four hours to complete the reaction of the tetra-iso-propyl methylenediphosphonate and phosphorus pentachloride to form methylenediphosphonyl tetrachloride and phosphorus oxychloride. A gas bubbler was then attached to a sulfur dioxide source, inserted in the solution and sulfur dioxide was bubbled through the solution for about one hour to react with the excess phosphorus pentachloride to form phosphorus oxychloride and thionyl chloride. After removing the phosphorus oxychloride and thionyl chloride by distillation, the methylenediphosphonyl tetrachloride, M.P. 101°–102° C., was isolated by washing with pentane and recrystallizing from benzene.

(B) Twenty-five grams of lithium aluminum hydride (0.66 mole) and 300 ml. of dibutyl ether were placed in a three-necked flask equipped with a solids addition funnel, a paddle stirrer, a thermometer, a condenser, an argon source and three traps. The last trap contained a 20% nitric acid solution to oxidize any volatile phosphines that might escape. After applying a positive argon pressure to the system, the lithium aluminum hydride dispersion was cooled and 75 g. (0.3 mole) of the methylenediphosphonyl tetrachloride was added slowly so that the reaction temperature did not exceed 5° C. After stirring for about one hour, 420 ml. of 20% hydrochloric acid were added dropwise at about 0°–5° C. Upon warming to room temperature the aqueous phase was separated via a stopcock in the bottom of the three-necked flask. The remaining dibutyl ether solution was washed with 25 ml. of 20% hydrochloric acid, then with 75 ml. of water, and finally with 25 ml. of saturated sodium chloride solution. After drying over molecular sieves, distillation gave 1.5 ml. of diphosphinomethane, B.P. 80°–85° C., a member of the new class of organophosphorus compounds disclosed herein. The phosphorus n.m.r. spectrum (a triplet at +126 p.p.m. relative to phosphoric acid, $J_{P-H}=204$ c.p.s.) and the proton n.m.r. spectrum were consistent with diphosphinomethane. The proton n.m.r. spectrum showed a doublet ($J_{P-H}=204$ c.p.s.) of triplets ($J_{P-H-\alpha,H}=7$ c.p.s.) centered at 7.01 λ for the $PH_2$ portion of the molecule. The methylene protons were obscured by a small amount of dibutyl ether impurity.

(C) The diphosphinomethane prepared above was converted to methylenediphosphonic acid, a useful detergency builder, in the following manner. The diphosphinomethane was placed in a three-necked flask with 50 ml. of hexane under an argon atmosphere and cooled to about 0° C. Two hundred ml. of a 0.3 N nitric acid solution were carefully added dropwise while the solution was stirred with a magnetic stirrer. The reaction mixture was then slowly warmed to about 65°–70° C. at which time vigorous reaction occurred. After the reaction subsided the mixture was heated to about 95° C. to complete the reaction. The methylenediphosphonic acid, M.P. 203°–205° C. was isolated by evaporation of the water and repeated digestion of the resulting solid with acetone.

EXAMPLE II 1,1-diphosphinododecane (A) Sodium hydride (42.5 g., 1.8 mole) was dispersed in 400 ml. of toluene in a three-necked flask equipped with (1) paddle stirrer, (2) argon source, (3) condenser, and (4) additional funnel containing 609 g. (1.77 moles) of tetra-iso-propyl methylenediphosphonate. The methylenediphosphonate ester was added softly so that the hydrogen evolution did not become too vigorous. Once hydrogen evolution was complete, 470 g. (2.0 moles) of undecyl bromide were added rapidly and the temperature was raised slowly to about 115° C. and maintained for about one hour to complete the reaction. The toluene was removed on a rotary evaporator and the crude product was dissolved in 1200 ml. of chloroform and washed three times with 200 ml. amounts of water. After the chloroform was removed on a rotary evaporator, the excess undecyl bromide and a small amount of tetra-iso-propyl methylene diphosphonate were removed by distillation of 10–20μ, heating with an oil bath which eventually reached about 180° C. The residue was about 86% tetra-iso-propyl dodecylidenediphosphonate contaminated with about 14% of the dialkylation product, terta-iso-propyl-12,12-tricosylidenediphosphonate.

(B) 370 g. of concentrated (37%) hydrochloric acid and 426 g. (0.85 mole) of the tetra-iso-propyl dodecylidenediphosphonate were heated to about 100° C. and refluxed for about forty (40) hours to form dodecylidene-diphosphonic acid. Upon cooling, the dodecylidenediphosphonic acid layer was separated and azeotroped dry with benzene. After filtering the product from the benzene the dodecylidenediphosphonic acid was digested with 300 ml. of diethyl-ether to remove the dialkylation product formed in the preceding reaction.

(C) Phosphorus pentachloride (520 g., 2.5 moles) was added slowly to 165 g. (0.5 mole) of the dodecylidenediphosphonic acid in 400 ml. of benzene using the apparatus described in Example I(A). After stirring the reaction mixture for about three hours at about 23° C., sulfur dioxide was passed through the solution for about one hour. Following distillation of the benzene, phosphorus oxychloride, and thionyl chloride under reduced pressure, the dodecylidenediphosphonyl tetrachloride, B.P. 180°–210° C./20μ was collected.

(D) Dodecylidenediphosphonyl tetrachloride (80.8 g., 0.2 mole) in 80 ml. of diethyl ether was added dropwise to 17.1 g. (0.45 mole) of lithium aluminum hydride in 320 ml. of diethyl ether at 0°–2° C. using the apparatus described in Example I(B). After stirring for 30 minutes, 500 ml. of 20% hydrochloric acid were added dropwise at 0°–8° C. Upon warming to room temperature the ether phase was separated, washed as in Example I(B) and distilled. 1,1-diphosphinododecane, B.P. 103°–105° C./0.1 mm. was obtained in this manner in 52% yield from dodecylidenediphosphonyl tetrachloride. The phosphorus n.m.r. spectrum (a triplet at 107 p.p.m., $J_{P-H}=200$ c.p.s.) and the proton n.m.r. spectrum were consistent with 1,1-diphosphinododecane. The $-PH_2$ portion of the proton n.m.r. spectrum appeared as two complex multiplets centered at 7.02 λ($J_{P-H}=200$ c.p.s.) rather than the expected doublet of doublets. Apparently the P–H protons are nonequivalent in the 1,1-diphosphinoalkanes but not in the diphosphinomethane or the internal gem-diphosphinoalkanes.

(E) The 1,1-diphosphinododecane was converted to tetrakis(hydroxymethyl)-diphosphinyldodecane, a useful detergent material, in the following manner. 1,1-diphosphinododecane (23 g., 0.1 mole) was mixed with 100 mls. of benzene in a three-necked flask equipped with (1) a magnetic stirrer, (2) condenser, and (3) a gas bubbler by means of which argon was passed through the solution. A flask containing 25 g. (0.83 mole) of paraformaldehyde was attached between the argon source and the gas bubbler. Upon heating, the paraformaldehyde dissociated to gaseous formaldehyde which was diluted with argon and passed into the benzene solution. Following the gaseous formaldehyde, 100 ml. of 7% hydrogen peroxide were added with cooling and the reaction mixture was stirred overnight. Removal of the benzene and water on a rotary evaporator gave a glassy material. Recrystallization of the glassy material from acetone gave 14 g. of tetrakis(hydroxymethyl)diphosphinyl dodecane, M.P. 112°–114° C.

When in the above example, part (C), the phosphorus pentachloride is reacted with the dodecylidenediphosphonic acid: (A) at temperatures of 15° C., 50° C. and 75° C. instead of 23° C.; and/or (B) for one-half hour, five hours and eight hours instead of about three hours; substantially similar results are obtained in that substantial amounts of dodecylidenediphosphonyl tetrachloride are produced for reduction to 1,1-diphosphinododecane.

Similarly, when in the above example, part (D), the lithium aluminum hydride is reacted with the dodecylidenediphosphonyl tetrachloride: (A) at temperatures of −15° C., −5° C. and 15° C. instead of about 0°–2° C.; and/or (B) for 15 minutes, 1.5 hours and 4 hours instead of about 30 minutes; substantially similar results are obtained in that substantial amounts of 1,1-diphosphinododecane are produced.

EXAMPLE III 1,1-diphosphinodecane 1,1-diphosphinodecane, B.P. 103°–105° C./4–5 mm., was obtained in 18% yield from the direct reduction of tetraethyl decylidenediphosphonate with lithium aluminum hydride. The same procedure as for the reduction of dodecylidenediphosphonyl tetrachloride in Example II, part (A), was used with the exception that the reduction mixture was refluxed for 32 hours before hydrolysis with concentrated hydrochloric acid. Even after 32 hours a considerable amount of unreacted tetraethyl decylidenediphosphonate was recovered.

EXAMPLE IV

1,1-diphosphinopentane

Amylidenediphosphonyl tetrachloride was prepared by using the same materials and procedures as Example II, parts (A)–(C), except that the undecyl bromide in part (A) was replaced by butyl bromide. 1,1-diphosphinopentane, B.P. 51°–52° C./7–8 mm. was prepared in 45% yield by reduction of amylidenediphosphonyl tetrachloride using the procedure described in Example II, part (D).

EXAMPLE V

1,1-diphosphinoundecane

Undecylidenediphosphonyl tetrachloride was prepared by using the same materials and procedures as Example II, parts (A)–(C), except that the undecyl bromide in part (A) was replaced by decyl bromide, 1,1-diphosphinoundecane, B.P. 88°–90° C./0.1 mm. was obtained in 70% yield by reduction of undecylidenediphosphonyl tetrachloride using the procedure described in Example II, part (D).

EXAMPLE VI

2,2-diphosphinopropane (A) Tetra-iso-propyl methylenediphosphonate (378 g., 1.1 moles) was added to 27 gm. (1.1 moles) of sodium hydride (addition 1) in one liter of monoglyme. After hydrogen evolution was complete, 156 g. (1.1 moles) of methyl iodide were added while cooling to keep the temperature below 30° C. After about one hour 28 g. (1.1 moles) of sodium hydride (addition 2) were added carefully to the mixture. After gas evolution was complete an additional 156 g. (1.1 moles) of methyl iodide were added with cooling. After stirring for about one hour, the monoglyme was removed on a rotary evaporator, and the product was dissolved in one liter of chloroform and washed with water to remove the sodium iodide. Two distillations gave 302 g. (73% yield) of tetra-iso-propyl-2,2-propylidenediphosphonate, B.P. 85°–90° C./0.15 mm.

(B) Tetra-iso-propyl 2,2-propylidenediphosphonate (221 g., 0.594 mole) was added dropwise to 620 g. (2.97 moles) of phosphorus pentachloride. After heating for about two hours at about 115° C., sulphur dioxide was passed through the mixture for about one hour. Following removal of the thionyl chloride and phosphorus oxychloride, vacuum sublimation gave 85 g. of 2,2-propylidenediphosphonyl tetrachloride, M.P. >100° C.

(C) The 2,2-propylidenediphosphonyl tetrachloride was reduced in the same manner as described in Example I, part (B), to give the desired 2,2-diphosphinopropane. The phosphorus n.m.r. spectrum (a triplet at +74 p.p.m., $J=197$ c.p.s.) and the proton n.m.r. spectrum were in agreement with that expected for 2,2-diphosphinopropane. The proton n.m.r. spectrum consisted of a doublet centered at 6.7λ ($J_{P-H}=197$ c.p.s.) and a triplet centered at 8.59λ ($J_{P-C-C-H}=12$ c.p.s.).

(D) The 2,2-diphosphinopropane is converted to 2,2-propylidenediphosphonic acid, a useful detergency builder, by oxidizing with nitric acid and purifying by digestion with acetone in the manner described in Example I, part (C).

When in the above example, the methyl groups of the methyl iodide in one or both of the methyl iodide additions are replaced in whole or in part by the following groups, substantially equivalent results are obtained in that a substantial amount of $RR'C[P(O)(OC_3H_7)_2]_2$ is produced for sequential reaction in the same manner as in parts (B) and (C), above, with phosphorus pentachloride and lithium aluminum hydride to form the respective compounds having the formula $RR'C[PH_2]_2$, R and R' being hydrogen or the specific hydrocarbon groups chosen, the total number of carbon atoms in R and R' being less than about 36: hydrogen, ethyl, n-propyl, iso-propyl, n-butyl, iso-butyl, n-pentyl, iso-pentyl, n-hexyl, n-octyl, iso-octyl, 2-ethylhexyl, di-iso-butyl, n-nonyl, tripropylene, n-decyl, undecyl, n-dodecyl, tridecyl, n-tetradecyl, pentadecyl, n-hexadecyl, n-heptadecyl, n-octadecyl, eicosyl, docosyl, triacontyl, cyclopentyl, cyclohexyl, cyclohexylmethyl, methylcyclohexyl, 2-cyclohexyldodecyl, 12-cyclohexyldodecyl, 4-dodecylcyclohexyl, 2-propenyl, 2-iso-butenyl, 3-5-hexadienyl, 3-ethyl-1-octenyl, 6-decenyl, 5-dodecenyl, 10-tetradecenyl, 9-hexadecenyl, 14-octadecenyl, 3,8-docosadienyl, ethynyl, 2-propynyl, 1,3-butadiynyl, 3-iso-pentynyl, 4-propynyl-1-pentynyl, 5-decynyl, 9-dodecynyl, 7-tetradecynyl, 13-hexadecynyl, 2,octadecynyl, 6,16-docosadiynyl, phenyl, biphenyl and naphthyl, benzyl, 2-phenyldodecyl, 1-methyl-2-phenylethyl, 2-indenyl naphthylmethyl, 2-decyloxyethyl, 2-octadecyloxyethyl and mixtures thereof in, e.g., 1:1 molar ratios.

All compounds prepared as described in the above examples have utility as intermediates in the preparation of detergents, detergency builders and/or fabric softeners.

What is claimed is:

1. A compound with the formula $RR'C(PH_2)_2$ wherein R' is hydrogen and R is an alkyl radical having from eight to about eighteen carbon atoms.
2. A compound with the formula $RR'C(PH_2)_2$ wherein R' is hydrogen and R is a hydrocarbon group having from one to about five linkages selected from the group consisting of ether and sulfide linkages.
3. 1,1-diphosphinodecane.
4. 1,1-diphosphinododecane.
5. 1,1-diphosphinotetradecane.
6. 2,2-diphosphinopropane.

References Cited

UNITED STATES PATENTS

| | | | |
|---|---|---|---|
| 3,086,053 | 4/1963 | Wagner | 260—606.5 |
| 3,268,580 | 8/1966 | Garber et al. | 260—606.5 X |
| 3,253,033 | 5/1966 | Maier | 260—606.5 X |

OTHER REFERENCES

Kosolapoff: Organophosphorus Compounds (1950, p. 139, QD412 P1K5.

Kosolapoff: Organophosphorus Compounds (1950, p. 61, QD412 P1K5.

Issleib et al.: Chem. Ber., vol. 92 (1959), p. 3176, QD1 D4.

Houben-Weyl: Methoden Der Organischen Chemie (1963), p. 59, QD258 H7.

TOBIAS E. LEVOW, *Primary Examiner.*

W. F. W. BELLAMY, *Assistant Examiner.*